(12) United States Patent
Noebel et al.

(10) Patent No.: US 8,651,422 B2
(45) Date of Patent: Feb. 18, 2014

(54) FUSELAGE SECTION HAVING AN INTEGRAL PRESSURE BULKHEAD, AS WELL AS A FUSELAGE SHELL HAVING SUCH A FUSELAGE SECTION

(75) Inventors: Torsten Noebel, Neuendeich (DE); Birgit Willms, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 113 days.

(21) Appl. No.: 13/017,567

(22) Filed: Jan. 31, 2011

(65) Prior Publication Data

US 2011/0198443 A1    Aug. 18, 2011

Related U.S. Application Data

(63) Continuation of application No. PCT/EP2009/059836, filed on Jul. 30, 2009.

(60) Provisional application No. 61/188,749, filed on Aug. 12, 2008.

(30) Foreign Application Priority Data

Aug. 12, 2008   (DE) .................... 10 2008 041 173

(51) Int. Cl.
  *B64C 1/10*    (2006.01)
  *B64C 1/26*    (2006.01)

(52) U.S. Cl.
  USPC .............................. 244/119; 244/131; 244/87

(58) Field of Classification Search
  USPC ................ 244/121, 119, 117 R, 120, 131, 87
  See application file for complete search history.

(56) References Cited

U.S. PATENT DOCUMENTS

| 5,062,589 | A |   | 11/1991 | Roth et al. |
| 5,297,760 | A | * | 3/1994  | Hart-Smith .................... 244/131 |
| 5,908,175 | A | * | 6/1999  | Magnes .......................... 244/119 |
| 5,934,616 | A | * | 8/1999  | Reimers et al. ................ 244/119 |
| 6,042,055 | A | * | 3/2000  | Messinger .................... 244/131 |

FOREIGN PATENT DOCUMENTS

| CN | 1083788      |    | 3/1994  |
| CN | 101102931    |    | 1/2008  |
| DE | 3010958      | A1 | 10/1981 |
| DE | 19503939     | C1 | 6/1996  |
| DE | 102006060360 |    | 6/2008  |
| EP | 0387400      | A  | 9/1990  |
| GB | 562 301      | A  | 6/1944  |
| WO | WO 2010/018063 |  | 2/2010  |

OTHER PUBLICATIONS

German Office Action for DE 10 2008 041 173.6 dated Dec. 2, 2010.

(Continued)

*Primary Examiner* — Tien Dinh
*Assistant Examiner* — Richard R Green
(74) *Attorney, Agent, or Firm* — Jenkins, Wilson, Taylor & Hunt, P.A.

(57) ABSTRACT

A fuselage section for the pressure fuselage of an aircraft which comprises a fuselage shell structure and at least one pressure bulkhead made of a fiber composite material, the pressure bulkhead being formed in one piece with the fuselage shell structure. A fuselage shell comprising at least one fuselage section of this type.

12 Claims, 1 Drawing Sheet

(56) References Cited

OTHER PUBLICATIONS

International Search Report for PCT/EP2009/059836 dated Nov. 12, 2009.

European Office Action for Application No. EP 09781261.4 dated May 2, 2012.

Chinese Office Action for Application No. 200980137354.8 dated Feb. 4, 2013.

* cited by examiner

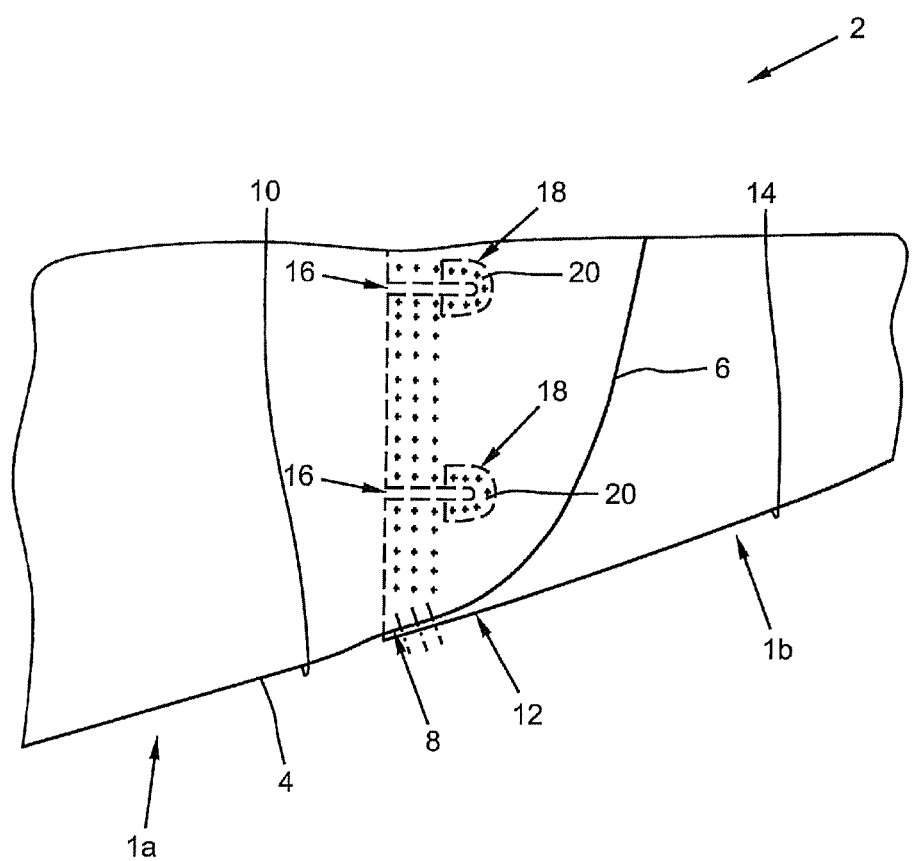

FUSELAGE SECTION HAVING AN INTEGRAL PRESSURE BULKHEAD, AS WELL AS A FUSELAGE SHELL HAVING SUCH A FUSELAGE SECTION

CROSS-REFERENCE TO RELATED APPLICATIONS

This application is a continuation of PCT/EP2009/059836 filed Jul. 30, 2009 and claims the benefit of and priority to U.S. Provisional Application No. 61/188,749, filed Aug. 12, 2008 and German Patent Application No. 10 2008 041 173.6, filed Aug. 12, 2008, the entire disclosures of which are herein incorporated by reference.

FIELD OF THE INVENTION

The invention relates to a fuselage section for the pressure fuselage of an aircraft comprising a fuselage shell structure and at least one pressure bulkhead made of a fibre composite material and to a fuselage shell for an aircraft comprising at least one fuselage section of this type.

Currently, pressure fuselages for aircraft are typically assembled from fuselage sections, pressure bulkheads forming the end of the press-worked aircraft cells. The pressure bulkheads are conventionally produced in differential construction and subsequently integrated into the corresponding fuselage section. A drawback of differential construction is the high number of parts and the production cost thus incurred with high structural weight.

To reduce the number of parts, a pressure bulkhead for an aircraft comprising a pressure fuselage is known, for example, from EP 0 387 400 A2, which pressure bulkhead is produced in one piece and has a spherical form which is adapted in the edge region to the fuselage cross-section. The pressure bulkhead which is formed in one piece is inserted into the fuselage section and fastened to the fuselage section at considerable production cost by means of a rivetted, welded or adhesively bonded joint. To ensure sufficient strength in the joint regions, it is also necessary for a joint to be dimensioned according to the structural loading and component thicknesses, in such a way that structural components of this type have a high structural weight.

SUMMARY OF THE INVENTION

In contrast, the object of the invention is to provide a fuselage shell comprising at least one fuselage section of this type which make it possible to minimise the structural weight at a low production cost.

This object is achieved by a fuselage shell according to the features of claim 1.

The fuselage section according to the invention for the pressure fuselage of an aircraft comprises a fuselage shell structure and at least one pressure bulkhead (pressure former) made of a fibre composite material, the pressure bulkhead being formed in one piece with the fuselage shell structure. Owing to the pressure bulkhead being formed integrally with the fuselage section, a high-strength structure which is optimised in terms of weight is achieved at a significantly reduced production cost. The fibre composite material structure is preferably formed according to the loading pattern of the fuselage section/pressure bulkhead unit, in such a way that a light, high-strength structure is made possible.

In a particularly preferred embodiment of the invention, the transition region of extends from the fuselage shell structure to the pressure bulkhead substantially continuously, without a sharp bend which would distort the fibre orientation. The transition from the pressure bulkhead to the fuselage shell structure is preferably relatively planar, in such a way that disadvantageous right angles in the fibre orientation are avoided.

In a specific embodiment, the fuselage section according to the invention is provided with a connection region for a rear fuselage section at the tail end. The connection region preferably has a reduced diameter, a peripheral outer surface of the fuselage section and a peripheral surface of the rear fuselage section arranged on the tail end of the fuselage section together forming a common outer surface.

According to a particularly preferred embodiment of the invention, the pressure bulkhead has a spherical, elliptical or oval shape. The pressure bulkhead is preferably provided with a spherical cap which is curved convexly towards the fuselage tail.

In particular, the fuselage section has a load-dependent progression of thickness, in such a way that the structural weight can be reduced further with high static and dynamic strength. In this case, a hybrid construction using different materials or a construction using like materials can be used, the fuselage shell structure having a high rigidity and the pressure bulkhead being formed as a thin, resilient diaphragm. In a preferred embodiment, the fuselage section is produced using prepreg or resin infusion technology in a winding or laying method. In this case, glass fibre or aramid fibre composite materials can also be used in addition to carbon fibre composite materials. In production using the winding method, for example using horizontal winding, the opening provided approximately in the centre of the spherical cap for the winding mandrel can be closed after the winding process using a doubler plate.

Reinforcements can also be provided in accordance with the loading pattern. These can be formed as thickenings or fitted profiled parts. In particular, stringers and/or formers can be used as profiled parts for reinforcement.

The possibility of producing the fuselage shell structure and the pressure bulkhead in a common one-piece or multi-piece mould has proven particularly advantageous.

According to the invention, the entire unit is preferably cured in an autoclave in one production step.

The fuselage shell according to the invention for an aircraft comprises at least one fuselage section, in which the pressure bulkhead is formed in one piece with the fuselage shell structure. The pressure bulkhead is used for example as a tail end of a pressure-ventilated region of an aircraft fuselage.

According to a particularly preferred embodiment of a fuselage shell, a peripheral outer surface of the fuselage section and a peripheral surface of a rear fuselage section arranged on the tail end of the fuselage section together form a common outer surface.

The rear fuselage section is preferably provided in an edge region with a plurality of tolerance-compensating notches. The notches can be limited, at least in portions, by a doubler plate. This provides even further improved component strength and reliability.

Other advantageous developments of the invention are disclosed in the further sub-claims.

BRIEF DESCRIPTION OF THE DRAWINGS

The invention is described in further detail below with reference to a preferred embodiment. The single FIGURE is a sectional view of a fuselage shell according to the invention in the region of a rear pressure bulkhead.

DESCRIPTION OF EXEMPLARY EMBODIMENTS

The FIGURE shows a detail of a fuselage shell 2 formed from a plurality of fuselage sections 1*a*, 1*b* for the pressure fuselage of an aircraft comprising an approximately conically tapering tail portion. The fuselage section 1*a* according to the invention comprises a fuselage shell structure 4 and a pressure bulkhead 6 made of a fibre composite material, the pressure bulkhead 6 being formed in one piece with the fuselage shell structure 4. The approximately spherical pressure bulkhead 6 (spherical pressure cap) is curved convexly towards the fuselage tail and forms a tail end of a pressure-ventilated region of the aircraft fuselage. The transition region from the fuselage shell structure 4 to the pressure bulkhead 6 extends continuously without a sharp bend which would distort the fibre orientation and is relatively planar, in such a way that disadvantageous right angles in the fibre orientation are avoided. Owing to the pressure bulkhead 6 being formed integrally with the fuselage section 1*a*, a high-strength structure which is optimised in terms of weight is achieved at a significantly reduced production cost. The fibre composite material structure is formed in accordance with the loading pattern of the fuselage section/pressure bulkhead arrangement. In particular, the fuselage section 1*a* has a load-dependent progression of thickness, in such a way that the structural weight can be reduced further with high static and dynamic strength. In this case, a hybrid construction using different materials or a construction using like materials can be used, the fuselage shell structure 4 having a high rigidity and the region of the pressure bulkhead 6 being formed as a thin, resilient diaphragm in the illustrated embodiment of the invention. By using flame-resistant or slow-burning materials, the pressure bulkhead 6 can also be used as a fireproof former or fireproof bulkhead. The illustrated fuselage section 1*a* with integrated pressure bulkhead 6 was produced in a common mould in a laying method using a prepreg technology and cured in an autoclave. To reinforce the fuselage shell structure, profiled parts (not shown) such as stringers and formers are provided on the inner surface of the sections 1*a*, 1*b* in a position-dependent manner as a function of the respective loading.

The front fuselage section 1*a* is provided with a connection region 8 for the tail-end rear fuselage section 1*b*. The connection region 8 has a diameter which is reduced in a stepped manner somewhat, an outer peripheral surface 10 of the front fuselage section 1*a* and a peripheral surface 14 of the rear fuselage section 1*b* arranged on the tail end of the fuselage section 1*a* together forming a common outer surface 12. The rear fuselage section 1*b* is provided in an edge region with tolerance-compensating, somewhat slit-shaped notches 16 which extend in the direction of the longitudinal axis of the aircraft. The notches 16 are each limited in a corner region 18 by a doubler plate 20 which is fastened to the inner surface of the rear fuselage section 1*b* by a rivetted joint, increases the strength in this region and serves as a crack arrestor. In the connection region 8, the two fuselage sections 1*a*, 1*b* are connected via a rivetted lap joint to the fuselage shell 2 of the aircraft fuselage, the rear fuselage section 1*b* encasing the front fuselage section 1*a* in the connection region 8.

The fuselage shell 2 according to the invention is not restricted to the above-described rivetting of the sections 1*a*, 1*b*. Rather, different joining methods known from the general prior art can be used, such as in particular an adhesive bonding method.

A fuselage section 1*a* for the pressure fuselage of an aircraft is disclosed which comprises a fuselage shell structure 4 and at least one pressure bulkhead 6 made of a fibre composite material, the pressure bulkhead 6 being formed in one piece with the fuselage shell structure 4. A fuselage shell 2 comprising at least one fuselage section 1*a* of this type is also disclosed.

LIST OF REFERENCE NUMERALS 1 fuselage section
2 fuselage shell
4 fuselage shell structure
6 pressure bulkhead
8 connection region
10 outer peripheral surface
12 outer surface
14 peripheral surface
16 notch
18 corner region
20 doubler plate

The invention claimed is:

1. A fuselage shell for an aircraft, comprising:
a front fuselage section, which comprises at least a pressure bulkhead and a fuselage shell structure made of a fibre composite material, wherein the pressure bulkhead is formed in one piece with the fuselage shell structure; and
a rear fuselage section which is arranged on the tail end of the front fuselage section, wherein only the rear fuselage section comprises an edge region comprising at least one tolerance-compensating notch, wherein the at least one tolerance-compensating notch is formed in a peripheral surface of the edge region of the rear fuselage section, wherein the notch is limited at least in a corner region by a doubler plate, and wherein the doubler plate completely surrounds the corner region.

2. The fuselage shell according to claim 1, wherein an outer peripheral surface of the front fuselage section and the peripheral surface of the edge region of the rear fuselage section together form a common outer surface.

3. The fuselage shell according to claim 1, wherein a transition region from the fuselage shell structure to the pressure bulkhead is formed continuously.

4. The fuselage shell according to claim 1, wherein the front fuselage section comprises a connection region, having a reduced diameter, for the rear fuselage section.

5. The fuselage shell according to claim 1, wherein the pressure bulkhead has a spherical, elliptical or oval shape.

6. The fuselage shell according to claim 1, wherein the front fuselage section has a load-dependent progression of thickness.

7. The fuselage shell according to claim 1, wherein the front fuselage section has a hybrid construction using different materials or a construction using like materials, the fuselage shell structure having a high rigidity and the pressure bulkhead being formed as a thin diaphragm.

8. The fuselage shell according claim 1, wherein the fuselage shell structure and the pressure bulkhead can be produced in a common, one-piece or multi-piece mould.

9. The fuselage section according to claim 1, wherein profiled parts comprising stringers and/or formers, are provided on the front fuselage section for reinforcement.

10. The fuselage section according to claim 9, wherein at least one of the stringers and formers are provided on the front fuselage section for reinforcement.

11. The fuselage shell according to claim 1, wherein the pressure bulkhead forms a tail end of a pressure-ventilated region of an aircraft fuselage.

12. The fuselage shell according to claim 1, wherein the doubler plate is riveted to the rear fuselage section, bonded to the rear fuselage section, formed as an integral part of the rear fuselage section, and formed as an interlaminar part of the fuselage section.

* * * * *